T. F. RAY, Jr.
LARD GAGE EXTRACTOR.
APPLICATION FILED SEPT. 26, 1908.
935,404.
Patented Sept. 28, 1909.
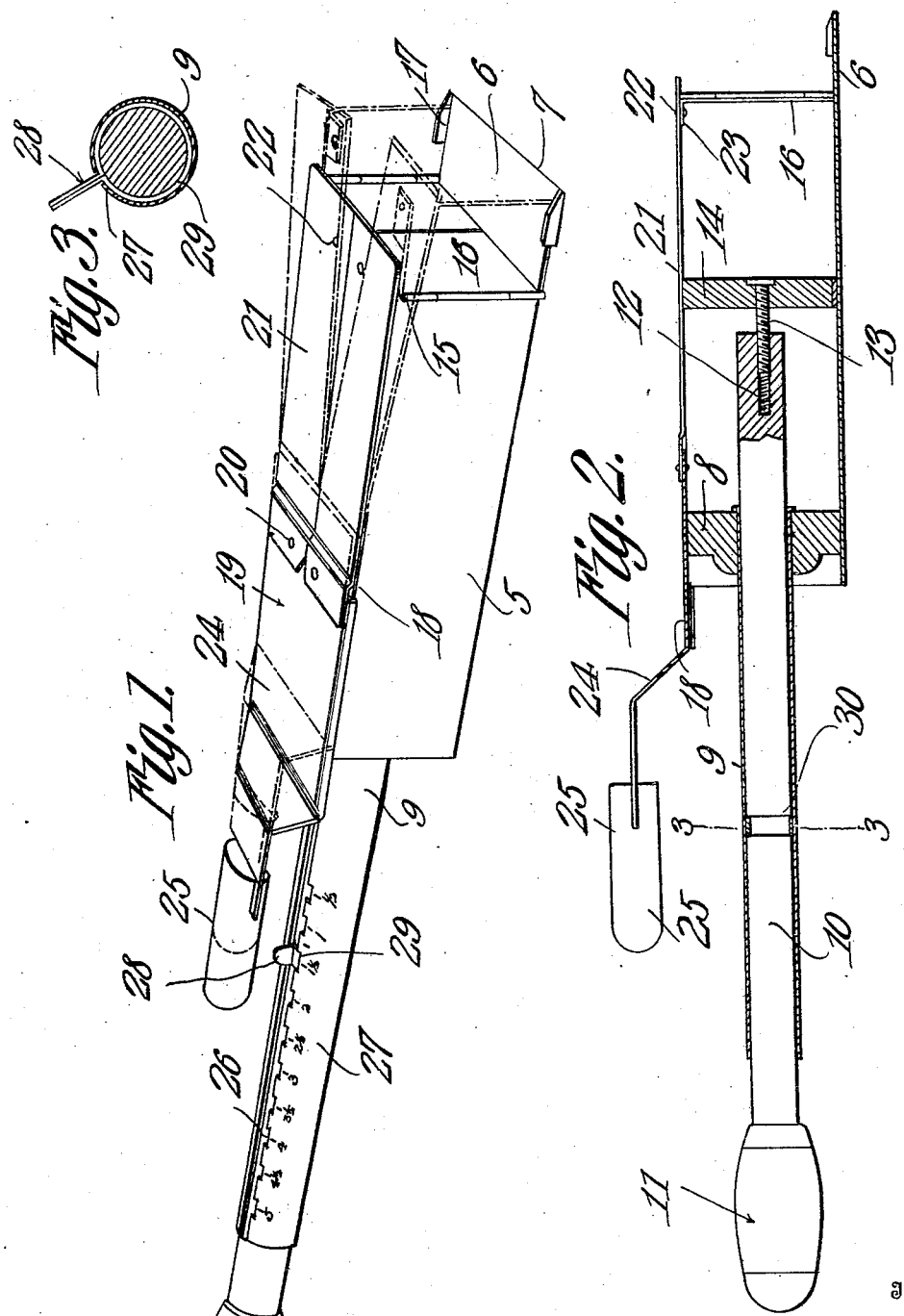
Witnesses
Inventor
Thomas F. Ray, Jr.,
By C. A. Snow & Co.
Attorneys

UNITED STATES PATENT OFFICE.

THOMAS FINTCHER RAY, JR., OF LAURENS, SOUTH CAROLINA, ASSIGNOR OF ONE-HALF TO BASCOM L. UMBERGER, OF CONCORD, NORTH CAROLINA.

LARD GAGE-EXTRACTOR.

935,404.  Specification of Letters Patent.  Patented Sept. 28, 1909.

Application filed September 26, 1908. Serial No. 454,850.

*To all whom it may concern:*

Be it known that I, THOMAS F. RAY, Jr., a citizen of the United States, residing at Laurens, in the county of Laurens and State of South Carolina, have invented a new and useful Lard Gage-Extractor, of which the following is a specification.

This invention relates to lard extractors and has for its object to provide a comparatively simple and thoroughly efficient device of this character by means of which predetermined quantities of lard, cottolene, butter and the like may be removed from a can or other containing vessel and deposited in a suitable tray without danger of soiling the hands of the operator.

A further object of the invention is to provide a lard extractor having a gage associated therewith for indicating in pounds and fractions thereof the quantity of lard or other material extracted.

A further object is to provide means for adjusting the plunger longitudinally of the barrel or casing so that the device may be used for extracting materials of different densities.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a perspective view of a lard extractor constructed in accordance with my invention showing in dotted lines the position assumed by the several parts when the device is inserted in the lard and in full lines the position assumed by the parts when removing the extractor from the lard. Fig. 2 is a longitudinal sectional view. Fig. 3 is a transverse sectional view taken on the line 3—3 of Fig. 2.

Similar numerals of reference indicate corresponding parts in all of the figures of the drawings.

The lard extractor forming the subject matter of the present invention comprises a casing or barrel 5 preferably rectangular in shape, as shown, and having its lower wall extended longitudinally beyond the adjacent side walls at the front end of the casing to produce a longitudinally disposed lip 6 having a cutting edge 7 by means of which the device may be readily forced into the lard, cottolene, or other material to be removed.

The rear end of the casing 5 is closed by a filling block 8 to which is secured in any suitable manner a metallic guide tube 9 in which is mounted for reciprocation a plunger 10. One end of the plunger is provided with a suitable operating handle 11, while the opposite end thereof is formed with a threaded socket 12 for engagement with a correspondingly threaded pin or bolt 13 secured to the plunger head 14.

Pivotally mounted at 15 on the side walls of the casing is a pair of end gates 16 which conjointly form a closure for the forward end of the casing, the opening movement of the gates 16 being limited by suitable stop lugs 17 extending vertically from the opposite longitudinal edges of the lip 6, as shown. Attention is here called to the fact that the lugs 17 are projected laterally beyond the adjacent walls of the lip 6 so that when the gates 16 are moved to open position, the inner faces of said gates will be disposed in alinement with the interior walls of the casing 5, thereby to present an unobstructed passage for the lard or other material within the casing when the plunger 14 is actuated to discharge the same.

The upper longitudinal edges of the side walls of the casing are bent laterally to produce guide flanges 18 which extend for a portion of the length of the casing and upon which is slidably mounted a door actuating member or plate 19. Pivotally mounted at 20 on the forward end of the member 19 are laterally movable wings 21 which are in turn pivotally connected at 22 with suitable ears 23 extending laterally from the upper edges of the end gates 16, as shown. The rear portion of the plate 19 is offset at 24 and thence extended longitudinally to form a handle 25 by means of which the member 19 may be adjusted longitudinally of the casing 5 to effect the opening and closing of the end gates.

The tubular member 9 is provided with a longitudinally disposed slot 26 having a plurality of notches or recesses 27 communicating therewith and arranged to receive the lateral actuating finger 28 of a locking member 29. The locking member 29 is preferably in the form of a loop or ring, the ends of which are brought together and extended to produce the finger 28, said locking member being mounted for rotation in an annular groove or recess 30 formed in the rod 10. The tubular member 9 is graduated to pounds and fractions thereof, each notch 27 being provided with a graduation so that the device may be used for measuring predetermined quantities of material.

If a customer desires, say two pounds of lard, the operator exerts a longitudinal pull on the handle 11 until the locking member 29 registers with the graduation 2 on the tubular member 9, after which the finger 28 is rotated so as to cause the same to enter the adjacent notch, thereby to lock the plunger head 14 at the desired position of adjustment in the casing 5. The doors or gates 16 are then moved to open position by exerting a forward movement on the handle 25 and the casing forced downwardly into the lard thus causing the latter to enter and fill the interior of the casing between the plunger head 14 and the pivoted doors. After the extractor is forced into the lard, the operator twists or partially rotates said extractor so as to form an opening in the lard around the extractor and sever the column of lard at the mouth of the casing, after which a rearward pull is exerted on the handle 25 which automatically closes the gates 16 and forces the column of lard within the compartment of the casing, the surplus lard escaping through the opening between the inner longitudinal edges of the wings 21, and also between the gates 16 as the latter are closed. After the gates are closed in the manner described, the casing containing the desired quantity of lard may be removed from the receptacle without danger of soiling the hands of the operator. In order to discharge the lard from the casing 5 it is merely necessary to move the gates 16 to open position by imparting a forward movement to the handle 25 and then release the finger 28 from the adjacent notch 27 thus allowing the lard to be ejected through the open end of the casing and deposited in a suitable tray designed to receive the same by imparting a longitudinal movement to the handle 11.

By forming the end of the rod 10 with a threaded socket the plunger 14 may be adjusted within the casing by rotating the handle 11 so that the device may be used for measuring materials of different densities.

It will thus be seen that the member 29 and finger 28 constitute the main locking means for the head 14, while the socket 12 and screw 13 constitute an auxiliary locking means for said head.

The device may be made in different sizes and shapes and the tube or gage 9 graduated to indicate any desired measurements.

Having thus described the invention what is claimed is:—

1. A device of the class described including a casing, a gate forming a closure for one end of the casing, a plunger operating within said casing, and means for moving the gate to open and closed positions.

2. A device of the class described including a casing, a plunger operating within the casing, means for locking the plunger in different positions of adjustment, a closure at one end of the casing, and means for actuating the closure thereby to permit the discharge of the contents of the casing.

3. A device of the class described including a casing, gates forming a closure for one end of the casing, a plunger operating within the casing, and means slidably mounted on said casing and operatively connected with the gates for moving the latter to open and closed positions.

4. A device of the class described including a casing, a plunger operating within the casing, gates forming a closure for one end of the plunger, means slidably mounted on the casing and operatively connected with the gates for moving the latter to open and closed positions, and means for locking the plunger in different positions of adjustment.

5. A device of the class described including a casing, a graduated tubular member secured to the casing and provided with a plurality of spaced notches, a rod operating within the tubular member and provided with a head disposed within the casing, gates forming a closure for one end of the casing, means for moving the gates to open and closed positions, and a locking member slidably mounted on the rod and adapted to enter the notches for locking the head in different positions of adjustment.

6. A device of the class described including a casing, a tubular member secured to one end of the casing and provided with a longitudinally disposed slot having a series of notches formed therein and communicating with said slot, a plunger rod operating within the tubular member and provided with a head movable within the casing, gates forming a closure for the opposite end of the casing, means slidably mounted on the casing and operatively connected with the gates for moving the latter to open and closed positions, there being an annular groove formed in the plunger rod, and a locking member mounted for rotation in said groove and provided with a terminal finger arranged to enter the notches in the tubular member for locking the plunger head in different positions of adjustment.

7. A device of the class described including a casing having one end thereof extended longitudinally to form a cutting lip, a graduated tubular member secured to the opposite end of the casing and provided with a longitudinal slot having a series of notches communicating therewith, a plunger rod operating within the tubular member and provided with a head operating within the casing, pivoted gates forming a closure for one end of the casing, a plate slidably mounted on the casing, wings pivotally connected with the plate and end gates, respectively, for moving said gates to open and closed positions, and a locking member mounted for rotation on the rod and arranged to enter the notches in the tubular member for locking the head in different positions of adjustment.

8. A device of the class described including a casing having its bottom wall extended longitudinally beyond the adjacent side walls to form a lip provided with oppositely disposed stop lugs, a plunger operating within the casing, and gates forming a closure for one end of the casing, and means slidably mounted on the casing and operatively connected with the end gates for moving the latter to open and closed positions, said lugs serving to limit the opening movement of the end gates.

9. A device of the class described including a casing having one end thereof extended longitudinally to form a lip, lugs secured to the opposite ends of the lip and extended laterally beyond the adjacent side walls of the casing, a plunger operating within the casing, a plate slidably mounted on the casing, wings pivotally connected with the plate and gates, respectively, for moving the latter to open and closed positions, said lugs serving to limit the opening movement of the gates.

10. A device of the class described including a casing provided with a longitudinally disposed lip, a tubular member secured to one end of the casing and provided with a longitudinal slot having spaced recesses communicating therewith, a rod slidably mounted within the tubular member and having one end thereof provided with an operating handle and its opposite end provided with a threaded socket, a head slidably mounted within the casing, a threaded bolt carried by the head and engaging the threaded socket in the rod, pivoted gates forming a closure for one end of the casing, means slidably mounted on the casing and operatively connected with the gates for moving the latter to open and closed positions, means carried by the lip for limiting the opening movement of the gates, and a locking member mounted for rotation on the rod and arranged to enter the notches for locking the plunger in different positions of adjustment.

11. A device of the class described including a casing, gates forming a closure for one end of the casing, means slidably mounted on the casing and operatively connected with the gates for moving the latter to open and closed positions, a plunger operating within the casing, and main and auxiliary means for locking the plunger in different positions of adjustment.

12. A device of the class described including a casing provided with a longitudinally disposed lip having a cutting edge, pivoted gates forming a closure for one end of the casing, means slidably mounted on the casing and operatively connected with the gates for moving the latter to open and closed positions, said lip being provided with oppositely disposed lugs offset with respect to the side walls of the casing and arranged to limit the opening movement of the gates, a tubular member secured to the casing and provided with a longitudinal slot having spaced notches communicating therewith, a rod operating within the tubular member, a head secured to the rod, a locking member mounted for rotation on the rod and provided with a finger arranged to enter the notches for locking the plunger in different positions of adjustment, and a threaded connection between the head and rod and constituting an auxiliary means for locking said head in adjusted position.

In testimony that I claim the foregoing as my own, I have hereto affixed my signature in the presence of two witnesses.

THOS. FINTCHER RAY, Jr.

Witnesses:
L. G. BALLE, Jr.,
R. B. CHILDRESS.